E. B. Butler.
Making Hub-Bands.
Nº 72719        Patented Dec. 31, 1867.
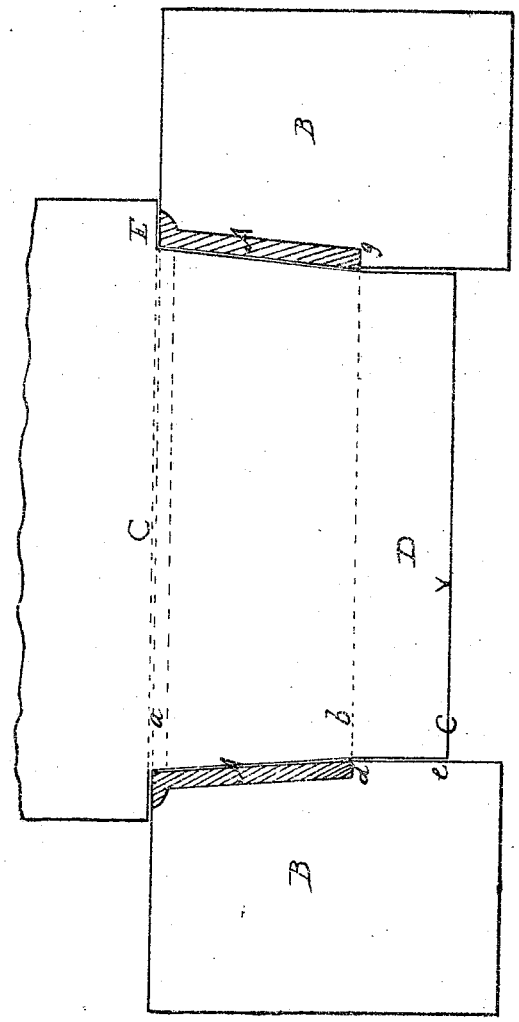
Witnesses:
Inventor:
E. B. Butler

United States Patent Office.

EDWIN B. BUTLER, OF NEW BRITAIN, CONNECTICUT.

Letters Patent No. 72,719, dated December 31, 1867.

IMPROVED METHOD OF MAKING HUB-BANDS.

The Schedule referred to in these Letters Patent and making part of the same.

TO ALL WHOM IT MAY CONCERN:

Be it known that I, EDWIN B. BUTLER, of New Britain, county of Hartford, and State of Connecticut, have invented certain new and useful Improvements in the Manufacture of Wagon-Hub Bands; and to enable others skilled in the art to make and use the same, I will proceed to describe the mode or process of execution, by referring to the drawings, in which the same letters indicate like parts in each of the figures.

The nature of this invention will be understood from the specification and drawings.

Heretofore, wagon-hub bands (as an article of manufacture) have been made of malleable iron, which present a good external appearance, but, owing to the deceptive character of the material, (and the imperfect manner of rendering them malleable,) from which they are produced, produces, very often, imperfect and unreliable bands, which render them insecure and unreliable for use. To remedy this want of security, and to produce a perfect and reliable article, equally cheap and merchantable, is the object of this invention.

In the accompanying drawings, B is a die, in which uniformity of shape is given to the band. C is a punch-die, which works into the forming-die, to compress the band into the shape of said die. A is the band, shown as being firmly compressed, on all sides, by the punch and die C B. The die B, besides having the outside shape and size formation of the band A worked therein, has a continuation of the depression or orifice, of equal diameter, required for the inside diameter of the band at its lower or small end. The punch or upper die C is made tapering, from $a$ to $b$, so as to correspond with the taper or shape of the die B, and allow the space or the sides of the die and punch to be parallel with each other. The lower end of the punch C is equal in diameter from $b$ to $c$, which fits closely and works freely in the die B, from $d$ to $e$. The die C is also provided with a shoulder, E, which fixes the downward motion of said die. These dies are fitted into drop or press in the common way.

The iron bars, from which the bands are cut, are about the thickness required for the band, and a little wider than what is required for the width of the band. The blanks are cut from these bars the required length, so that, when welded together, they will be nearly the diameter required for a band. After these bands have been welded together, they are heated to a proper heat, and placed, one at a time, in the die B. The die C then descends, the lower end of which first passes through the band, and enters the lower portion of the die D, which prevents the metal from working down below the shoulder $g$, thus continuing its downward motion, until the metal ring is firmly compressed (to fill the die-formation) between the dies C B, and the shoulder E of the punch-die C rests upon the upper surface of the die B.

Thus I am enabled to produce an improved article of manufacture, which is strong, durable, and reliable for use, rich in its appearance, and cheap of manufacture.

I believe I have thus shown the nature, the mode or process of manufacture, and the great advantage to be derived therefrom, so as to enable others skilled to make and use therefrom.

I claim the method herein described of making hub-bands; that is to say, take a strip of metal of width equal to that required for the band, and of proper length, welding the two ends of said strip together, and afterwards swaging the same in dies, constructed substantially as set forth.

EDWIN B. BUTLER. [L. S.]

Witnesses:
  N. C. WILDER,
  JEREMY W. BLISS.